United States Patent
Yun

(10) Patent No.: US 9,401,504 B2
(45) Date of Patent: Jul. 26, 2016

(54) BATTERY CELL

(71) Applicant: SAMSUNG SDI CO., LTD., Yongin-si, Gyeonggi-do (KR)

(72) Inventor: Ji-Won Yun, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 251 days.

(21) Appl. No.: 13/831,645

(22) Filed: Mar. 15, 2013

(65) Prior Publication Data

US 2013/0330586 A1     Dec. 12, 2013

Related U.S. Application Data

(60) Provisional application No. 61/657,498, filed on Jun. 8, 2012.

(51) Int. Cl.
| | |
|---|---|
| *H01M 2/14* | (2006.01) |
| *H01M 2/02* | (2006.01) |
| *H01M 2/10* | (2006.01) |
| *H01M 10/04* | (2006.01) |

(52) U.S. Cl.
CPC ............. *H01M 2/14* (2013.01); *H01M 2/021* (2013.01); *H01M 2/0275* (2013.01); *H01M 2/0277* (2013.01); *H01M 2/0287* (2013.01); *H01M 2/1094* (2013.01); *H01M 10/0431* (2013.01); *H01M 10/0468* (2013.01)

(58) Field of Classification Search
None
See application file for complete search history.

(56) References Cited

U.S. PATENT DOCUMENTS

2010/0291432 A1*   11/2010   Kim .................. 429/163
2011/0008672 A1*   1/2011   Kim .................. 429/174

FOREIGN PATENT DOCUMENTS

| EP | 1 022 798 A2 | 7/2000 |
|---|---|---|
| EP | 1 445 806 A1 | 8/2004 |
| EP | 1 447 864 A1 | 8/2004 |
| EP | 2 273 599 A1 | 1/2011 |
| KR | 10-2000-0051639 | 8/2000 |
| KR | 10-2007-0006255 | 1/2007 |
| KR | 10-2008-0035226 | 4/2008 |
| KR | 10-2009-0088761 | 8/2009 |
| KR | 10-2011-0035484 | 4/2011 |

OTHER PUBLICATIONS

EPO Search Report dated Apr. 23, 2014, for corresponding European Patent application 13163664.9, (11 pages).
EPO Search Report dated Oct. 7, 2013, for corresponding European Patent application 13163664.9, (5 pages).

\* cited by examiner

*Primary Examiner* — Patrick Ryan
*Assistant Examiner* — Christopher Domone
(74) *Attorney, Agent, or Firm* — Lewis Roca Rothgerber Christie LLP

(57) ABSTRACT

A battery cell including an electrode assembly; a taping portion on the electrode assembly, the taping portion including a first adhesive layer on the outer surface of the electrode assembly, a first base layer on the first adhesive layer, and a second base layer on the first base layer; and a case receiving the electrode assembly.

17 Claims, 5 Drawing Sheets

BATTERY CELL

CROSS-REFERENCE TO RELATED APPLICATION

This application claims priority to and the benefit of U.S. Provisional Application No. 61/657,498, filed on Jun. 8, 2012 in the U.S. Patent and Trademark Office, the entire content of which is incorporated herein by reference.

BACKGROUND

1. Field

Aspects of embodiments of the present invention relate to a battery cell.

2. Description of the Related Art

Recently, a battery cell has been variously used as a power source of portable electronic devices. In addition, the portable electronic devices have been used in various fields and, as a consequence, the demand for the battery cell has rapidly increased. Since the battery cell is able to be reused many times by charging and discharging, it is effective in economic and environmental terms. Therefore, the use of the battery cell has been encouraged.

Further, in accordance with the demand for miniaturization and lightness of the electronic device, miniaturization and lightness of the battery cell are desired. However, since the battery cell contains a material having high reactivity, such as lithium, therein, there has been a limitation in making the battery cell small in size and light in weight for reasons of stability. Therefore, studies on a technology for developing a battery cell that may be miniaturized and light in weight while, at the same time, having improved stability have been conducted.

SUMMARY

According to an aspect of embodiments of the present invention, a battery cell is small iz size and light in weight, while also having improved stability. According to another aspect of embodiments of the present invention, a battery cell has improved impact strength.

According to an embodiment of the present invention, a battery cell includes: an electrode assembly; a taping portion on the electrode assembly, the taping portion including a first adhesive layer on the outer surface of the electrode assembly, a first base layer on the first adhesive layer, and a second base layer on the first base layer; and a case receiving the electrode assembly.

In one embodiment, one of the first base layer or the second base layer has an elongation greater than an elongation of the other of the first base layer or the second base layer, and the one of the first base layer or the second base layer has a tensile strength less than a tensile strength of the other of the first base layer or the second base layer.

The one of the first base layer or the second base layer may be the first base layer, and the other of the first base layer or the second base layer may be the second base layer.

The elongation of the one of the first base layer or the second base layer may be greater than 139.5%, and the tensile strength of the other of the first base layer or the second base layer may be greater than 21,246.4 N/cm².

The taping portion may enclose the outer surface of the electrode assembly.

The electrode assembly may include a first electrode plate, a separator, and a second electrode plate wound together and defining a winding end, and the taping portion may cover the winding end.

The first base layer may include at least one of polyimide, polyparaphenylene sulfide (PPS), or polypropylene, and the second base layer may include at least one of polyimide, polyparaphenylene sulfide (PPS), or polyethylene terephthalate (PET).

The first base layer may include polypropylene, and the second base layer may include polyethylene terephthalate (PET).

The taping portion may further include a second adhesive layer between the first base layer and the second base layer.

The first base layer and the second base layer may be heat joined to each other.

The second base layer may include first protrusions on an outer surface of the second base layer facing away from the first base layer, and first grooves between the first protrusions.

The first grooves may extend around a circumferential direction of the outer surface of the electrode assembly.

The first protrusions may contact an inner surface of the case.

The first protrusions may have substantially rectangular cross-sectional areas.

The first protrusions may include second protrusions on outer surfaces of the first protrusions facing away from the first base layer, and second grooves between the second protrusions.

The second grooves may extend around a circumferential direction of the outer surface of the electrode assembly.

The second protrusions may contact an inner surface of the case.

The second base layer may contact an inner surface of the case.

The case may have a substantially rectangular cross-sectional shape.

According to another embodiment of the present invention, a battery cell includes: an electrode assembly; a taping portion enclosing an outer peripheral surface of the electrode assembly and including a first adhesive layer positioned on the outer peripheral surface of the electrode assembly, a first base layer positioned on an outer peripheral surface of the first adhesive layer, a second base layer positioned on the outer peripheral surface of the first base layer; and a case receiving the electrode assembly enclosed by the taping portion, wherein one of the first base layer or the second base layer has an elongation greater than that of the other and has a tensile strength less than that of the other.

The first base layer may contain polypropylene, and the second base layer may contain polyethylene terephthalate (PET).

The electrode assembly may include a cathode plate, a separator, and an anode plate sequentially wound, and the taping portion may enclose a winding ending line at which the windings are ended.

The second base layer may have first groove portions and first protrusion portions formed on an outer peripheral surface of the second base layer.

The first protrusion portion may contact an inner peripheral surface of the case.

The first protrusion portion may have a second groove portion and a second protrusion portion.

The second protrusion portion may contact the inner peripheral surface of the case.

The case may be a generally square or rectangular shaped can.

The first base layer may have an elongation greater than that of the second base layer, and the second base layer may have a tensile strength greater than that of the first base layer.

The first base layer and the second base layer may include a second adhesive layer therebetween to attach the first base layer to the second base layer.

The first base layer and the second base layer may be heat joined to each other.

BRIEF DESCRIPTION OF THE DRAWINGS

The accompanying drawings, together with the specification, illustrate some exemplary embodiments of the present invention, and, together with the description, serve to explain principles and aspects of the present invention.

DETAILED DESCRIPTION

Figure 1:
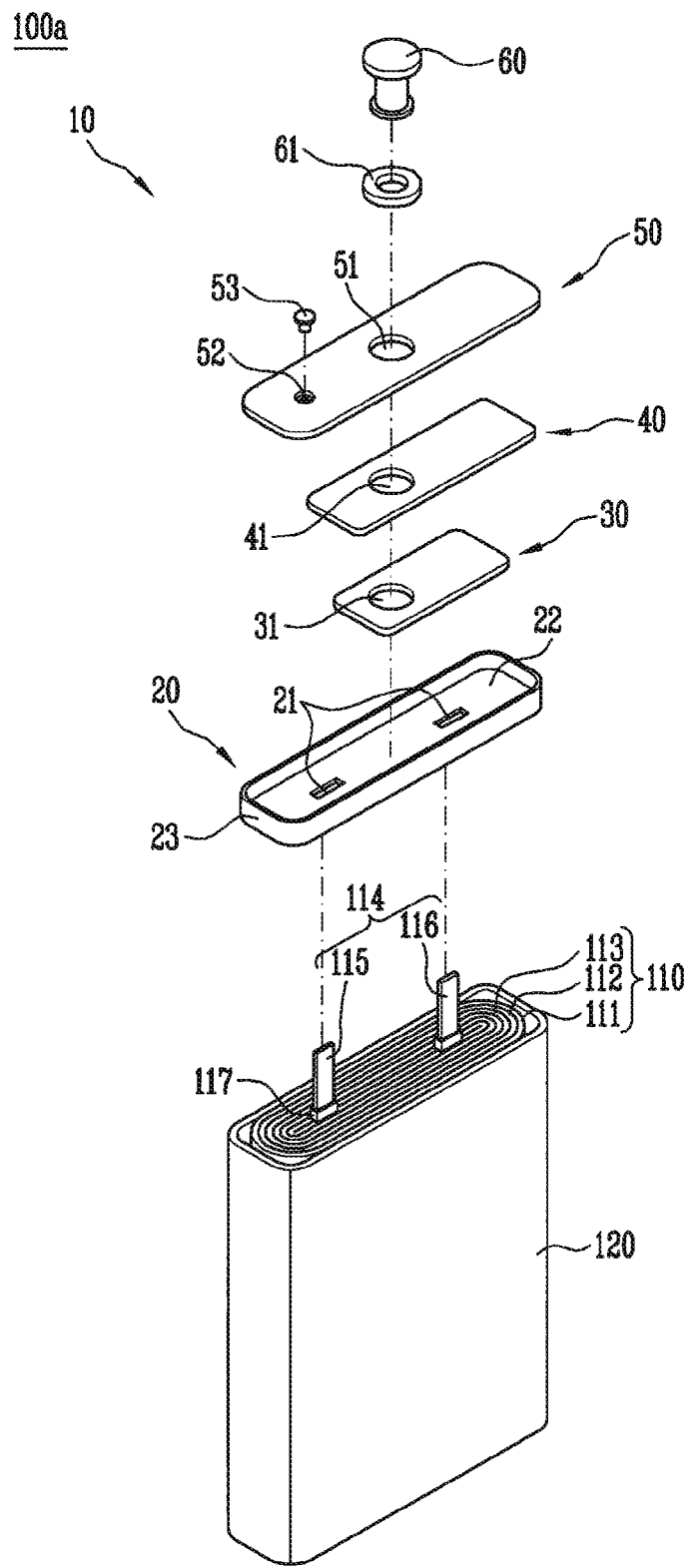
FIG. 1 is an exploded perspective view of a battery cell according to an exemplary embodiment of the present invention.

In the following detailed description, certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

Various objects, advantages, and features of the present invention will become apparent from the following detailed description and exemplary embodiments taken in conjunction with the accompanying drawings. In the specification, in adding reference numerals to components throughout the drawings, it is to be noted that like reference numerals designate like components even though components are shown in different drawings. Further, terms used in the specification, such as "first," "second," etc. can be used to describe various components, but the components are not to be construed as being limited to the terms.

Hereinafter, some exemplary embodiments of the present invention are described in further detail with reference to the accompanying drawings.

FIG. 1 is an exploded perspective view of a battery cell 100a according to an exemplary embodiment of the present invention. The battery cell 100a according to an exemplary embodiment of the present invention is described below with reference to FIG. 1.

As shown in FIG. 1, the battery cell 100a according to an exemplary embodiment of the present invention includes an electrode assembly 110, a taping portion 130 enclosing an outer peripheral surface of the electrode assembly (shown in FIG. 2), a case 120 receiving the electrode assembly 110, and a cap assembly 10 closing an opening of the case 120. The taping portion 130, in one embodiment, may include a first adhesive layer 133, a first base layer 132, and a second base layer 131 (shown in FIG. 2).

The case 120 is a member receiving the electrode assembly 110.

In one embodiment, the case 120 receives the electrode assembly 110 through an opening, such that the electrode assembly 110 may be protected from external impact. In one embodiment, the case 120 may be made of a metal material using a deep drawing technique. A horizontal cross-section of the case may have a generally rectangular shape with rounded edges. However, a shape of the case 120 is not limited thereto, but may be implemented in a rectangular shape or an oval shape, for example.

According to other embodiments of the present invention, the case 120 may be substantially square shaped or circular shaped.

In one embodiment, the cap assembly 10, which is a member closing an opening of the case 120, may include a cap plate 50, an electrode terminal 60, an insulation plate 40, a terminal plate 30, and a gasket 61. The cap assembly 10, in one embodiment, may be coupled to the case 120 of the battery cell 100a by a forced-fitting technique and may be made of an aluminum or aluminum alloy, for example.

In one embodiment, at the time of coupling the cap assembly 10 with the case 120, the cap plate 50 may close an opening of the case 120 to form a surface of the case 120. In one embodiment, the cap plate 50 may be coupled to the case 120 using a method such as welding. In one embodiment, the cap plate 50 may be electrically connected to one of electrode taps 114 extended through lead through holes 21 of an insulation case 20. The cap plate 50 may be formed with a first terminal hole 51 for coupling the gasket 61 with the electrode terminal 60 and an electrolyte injection hole 52 to be used as a passage for injecting electrolyte solution. After injecting the electrolyte solution through the electrolyte injection hole 52, the electrolyte injection hole 52 may be closed with a cap 53.

The gasket 61 secures insulation between the electrode terminal 60 and the cap plate 50, and may be positioned therebetween. The gasket 61 may have a hole at a position corresponding to the first terminal hole 51 of the cap plate 50, such that the electrode terminal 60 may be coupled to the gasket 61 and the cap plate 50 through the hole and the first terminal hole 51.

The insulation plate 40 is interposed between the cap plate 50 and the terminal plate 30 for insulation therebetween. The insulation plate 40 may have a second terminal hole 41 at a position corresponding to the first terminal hole 51, and the electrode terminal 60 passing through the first terminal hole 51 and a hole of the gasket 61 may also penetrate through the second terminal hole 41.

In one embodiment, the electrode terminal 60 may penetrate to a third terminal hole 31 formed on the terminal plate 30, such that the electrode terminal 60 may be electrically connected to the terminal plate 30. In addition, the terminal plate 30 may be electrically connected to one of the electrode taps 114 that is not connected to the cap plate 50. In one embodiment, the cap plate 50 is electrically connected to a cathode tap 115 of the electrode taps 114, and the terminal plate 30 is connected to an anode tap 116 of the electrode taps 114, thereby providing an electrical connection between the electrode terminal 60 and the anode tap 116.

The battery cell 100a according to an embodiment of the present invention further includes the insulation case 20 interposed between the electrode assembly 110 and the cap assembly 10.

In one embodiment, the insulation case 20 is positioned between the electrode assembly 110 and the terminal plate 30 in order to prevent or substantially prevent the electrode assembly 110, the cap plate 50, the terminal plate 30, or the like, from being electrically short circuited. The insulation case 20 may be positioned at an upper portion of the case 120, and may be made of a hard plastic resin having excellent electrical insulating properties. Therefore, in the case of inserting the insulation case 20 into the case 120, there may be little deformation due to electrolyte solution and insulation between the electrode assembly 110 and the cap assembly 10 may be easily secured.

Since in a case of using the hard plastic resin as the insulation case 20, it is difficult to couple the insulation case 20 to the case 120 due to low elasticity, in one embodiment, the insulation case 20 is configured of a base portion 22 and a support portion 23 to thereby be stably coupled to the case 120. The base portion 22 may be a lower surface of the insulation case 20, and the support portion 23 is an outer side surface of the insulation case 20. The base portion 22 of the insulation case 20 may be formed as a plate having a thickness (e.g., a predetermined thickness) and may be formed having a shape similar to the horizontal cross-sectional shape of the case 120, and, in particular, to the cross-sectional shape of a remaining space after receiving the electrode assembly 110. In one embodiment, the base portion 22 of the insulation case 20 has an area slightly larger than that of the cross-section of the remaining space in order to be force-fitted or press-fitted to the case 120. The base portion 22 of the insulation case 20 described above may be formed with the electrolyte injection hole and lead through holes.

The electrode assembly 110 is a member which has electrode taps at one side and produces electrochemical energy through migration of electrons or ions.

In one embodiment, the electrode assembly 110 may be formed of a cathode plate 113, an anode plate 111, and a separator 112 that are wound in a state in which the separator 112 is between the cathode plate 113 and the anode plate 111. The cathode plate 113 and the anode plate 111 may be made by coating and drying slurry on an aluminum metal foil and a copper metal foil, respectively. The slurry may contain an active material of each of the anode plate 111 and a fixing material attaching the active material to the metal foil. In the case of the lithium secondary battery, lithium-containing oxide may be used as the cathode plate active material and one of hard carbon, soft carbon, graphite, or a carbon material may be used as the anode plate active material. However, the present invention is not limited to the lithium secondary battery.

The cathode tap 115 may be coupled to the cathode plate 113 to protrude upwardly of the electrode assembly 110, and the anode tap 116 may be coupled to the anode plate 111 to protrude upwardly of the electrode assembly 110. In the electrode assembly 110, the cathode tap 115 and the anode tap 116 are spaced apart from each other by a distance (e.g., a predetermined distance), such that they may be electrically separated from each other. Further, the cathode tap 115 and the anode tap 116 may be electrically connected to the cathode plate 113 and the anode plate 111 of the electrode assembly 110, respectively, and be extended in an open direction of the case 120. In one embodiment, the cathode tap 115 and the anode tap 116 penetrate through each lead through hole 21 of the insulation case 20 fixed at the upper portion of the electrode assembly in the case 120, such that they may be connected to the case 120, the cap plate 50, or the terminal plate 30.

In one embodiment, portions of the cathode tap 115 and the anode tap 116 extended from the electrode assembly 110 may be wound by a lamination tape 117. The lamination tape 117 may block heat generated at the anode tap 116 and prevent or substantially prevent the electrode assembly 110 from being pressed by an edge of the cathode tap 115 or the anode tap 116.

Figure 2:
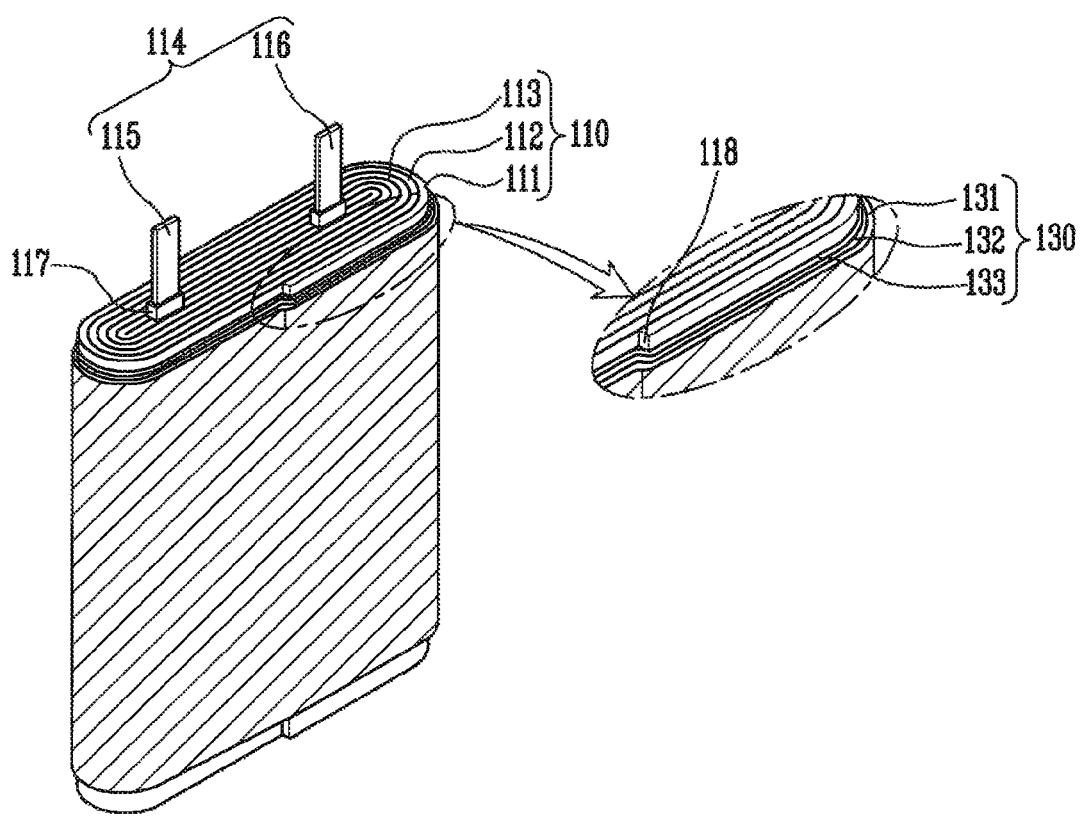
FIG. 2 is a perspective view of an electrode assembly of the battery cell of FIG. 1, and a taping portion enclosing the electrode assembly, according to an embodiment of the present invention.
Figure 3:
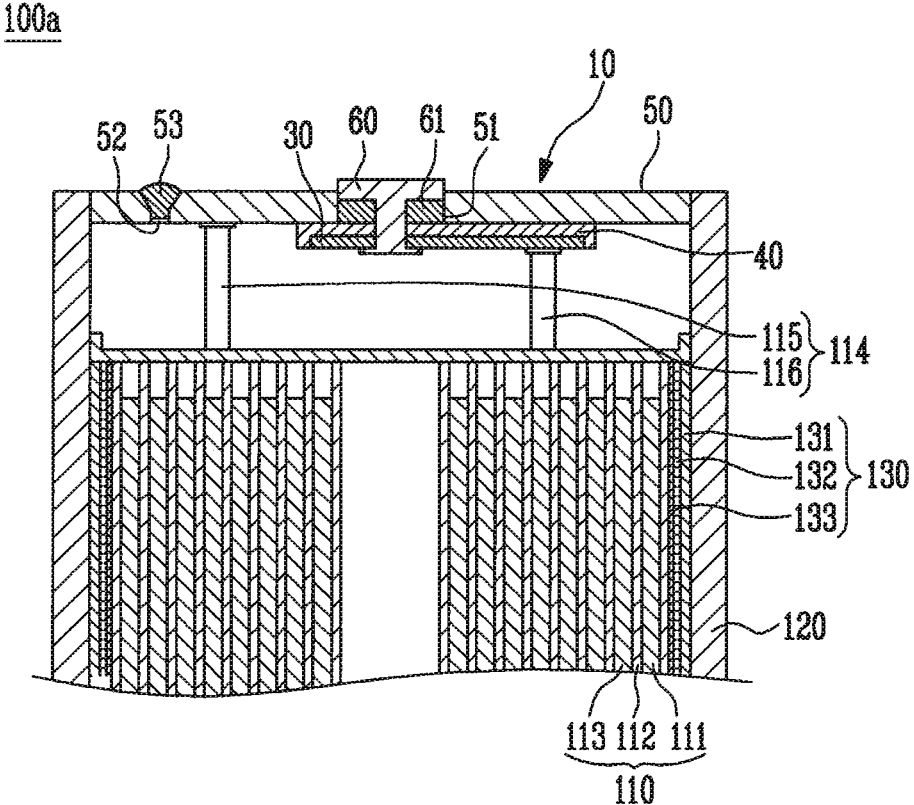
FIG. 3 is a partial cross-sectional view of the battery cell of FIG. 1.
Figure 4:
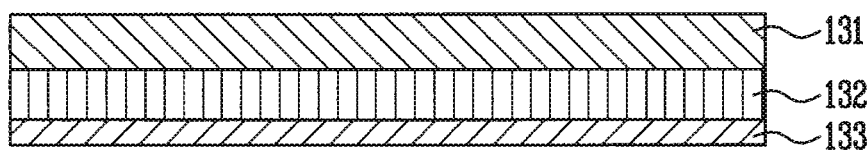
FIG. 4 is a cross-sectional view of the taping portion of FIG. 2.

FIG. 2 is a perspective view of the electrode assembly 110 of the battery cell 100a, and the taping portion 130 enclosing the electrode assembly 110, according to an embodiment of the present invention; FIG. 3 is a partial cross-sectional view of the battery cell 100a of FIG. 1; and FIG. 4 is a cross-sectional view of the taping portion 130. The taping portion 130 according to an exemplary embodiment of the present invention is described below with reference to FIGS. 2 to 4.

As shown in FIG. 2, the taping portion 130 according to an exemplary embodiment of the present invention may enclose the outer peripheral surface of the electrode assembly 110, and, in one embodiment, may enclose a winding end line 118 in which the windings of the electrode assembly 110 end. Therefore, according to an embodiment of the present invention, problems in which, when the electrode assembly 110 having the cathode plate 113, the separator 112, and the anode plate 111 wound together is inserted into the case 120, the windings might otherwise come loose, or it is difficult to receive the electrode assembly 110 in the case 120 due to friction with an inner surface of the case 120, may be prevented or substantially prevented. In addition, the taping portion 130, together with the case 120, may protect the electrode assembly 110 from an external impact.

When a battery cell is used, a case in which the battery cell is impacted by an external member (e.g., a dent member of which a distal end is sharp and pointed) may occur. If the external member were to penetrate through the case and a taping portion of the battery cell and contact the electrode assembly, a short circuit between the dent member and the cathode plate or the anode plate may occur, such that the battery cell may not perform its function properly. However, in the battery cell 100a according to an exemplary embodiment of the present invention, the taping portion 130 is implemented as a material having high elongation and tensile strength, and the external member may not pass through the taping portion 130 when it may otherwise penetrate through the battery cell, thereby preventing or substantially preventing the battery cell 100a and the external member from being short circuited to each other.

In one embodiment, the taping portion 130 described above includes the first base layer 132 and the second base layer 131.

The first adhesive layer 133 is a member which is positioned on the outer peripheral surface of the electrode assembly 110 to attach the first base layer 132 to the outer peripheral surface of the electrode assembly 110. Therefore, a phenomenon in which the windings of the electrode assembly 110 become loose may be prevented or substantially prevented due to the first adhesive layer 133.

The first base layer 132 is a member which is positioned at the outer peripheral surface of the first adhesive layer 133 attached to the outer peripheral surface of the electrode assembly 110.

In one embodiment, the first base layer 132 is made of a material having elongation greater than that of a material of which the second base layer 131 is made. Therefore, even in the case in which an external member (e.g., a dent member having a sharp and pointed distal end) may penetrate through the battery cell 100a from the outside, due to the high elongation of the first base layer 132, the first base layer 132 may only be elongated by the external member, and it may be difficult for the first base layer 132 to be penetrated by the external member. In one embodiment, the material of the first base layer 132 may be, for example, polyimide (PI), polyparaphenylene sulfide (PPS), or polypropylene (PP), which are listed sequentially from high to low elongation, or the like. In one embodiment, considering a cost or the like, the first base layer 132 may be made of polypropylene (PP).

The second base layer 131 is a member which is positioned on an outer peripheral surface of the first base layer 132 attached to the first adhesive layer 133.

In one embodiment, the second base layer 131 may be made of a material different from that of a material of which the first base layer 132 is made. In one embodiment, the second base layer 131 may be made of a material having tensile strength greater than that of a material of which the first base layer 132 is made. Therefore, even in the case in which the external member may penetrate through the battery cell 100a from the outside, due to high tensile strength of the second base layer 131, it may be difficult for the second base layer 131 to be penetrated by the external member. When the tensile strength increases, even though the external member impacts the second base layer 131 to thereby apply tension to the second base layer 131, the second base layer 131 may withstand the tension. Therefore, it is difficult for the second base layer 131 to be penetrated by the external member. In one embodiment, the material of the second base layer 131 may be, for example, polyethylene terephthalate (PET), polyimide (PI), polyparaphenylene sulfide (PPS), or the like. In one embodiment, considering a cost or the like, the second base layer 131 may be made of polyethylene terephthalate (PET).

In one embodiment, the second base layer 131 may be stacked with the first base layer 132 by heat-junction, or heat joining. In one embodiment, the second base layer 131 may be stacked with the first base layer 132 with an adhesive layer therebetween, as described later herein with reference to FIG. 6.

According to an embodiment of the present invention, since the first base layer 132 has high elongation and the second base layer 131 has high tensile strength, in the case in which the first base layer 132 and the second base layer 131 are stacked with each other to form a taping portion 130 it is more difficult for an external member (e.g., a dent member) to penetrate the taping portion 130. This is because the high elongation and tensile strength of the taping portion 130 increases a force required for penetration of the external member. As such, according to embodiments of the present invention, an impact strength is increased.

According to an exemplary embodiment of the present invention, although the first base layer 132 is described as the member having relatively great elongation and the second base layer 131 is described as the member having relatively great tensile strength, the exemplary embodiment of the present invention is not limited thereto. For example, in one embodiment, the first base layer 132 may be made of a member having relatively great tensile strength, and the second base layer 131 may be made of a member having relatively great elongation.

Figure 5:
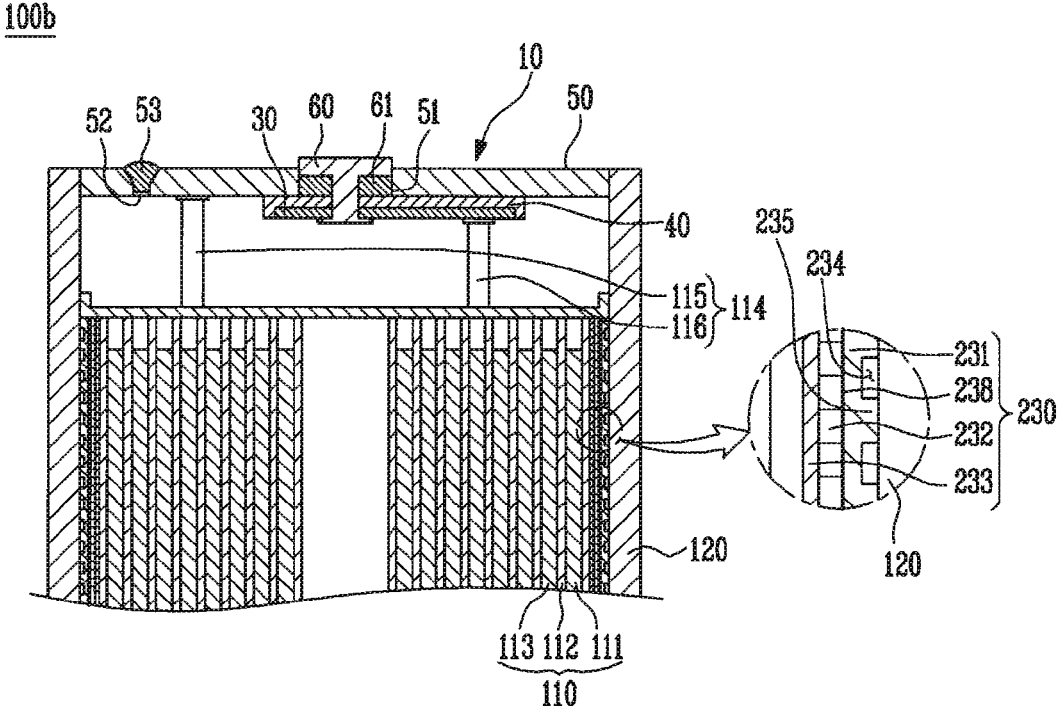
FIG. 5 is a partial cross-sectional view of a battery cell according to another exemplary embodiment of the present invention.
Figure 6:
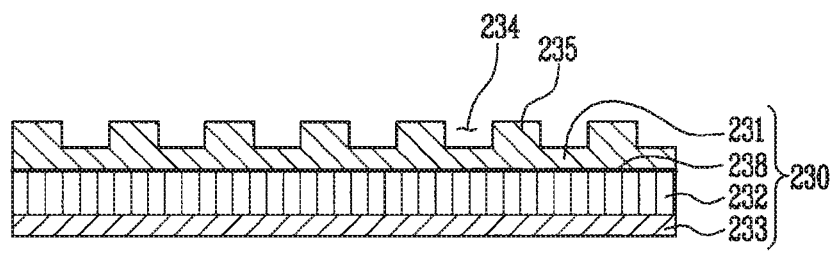
FIG. 6 is a cross-sectional view of a taping portion of the battery cell of FIG. 5, according to an embodiment of the present invention.

FIG. 5 is a partial cross-sectional view of a battery cell 100b according to another exemplary embodiment of the present invention; and FIG. 6 is a cross-sectional view of a taping portion 230 of the battery cell 100b, according to an embodiment of the present invention. The battery cell 100b according to another exemplary embodiment of the present invention is described below with reference to FIGS. 5 and 6. Like reference numerals will be used to describe like or corresponding components and further description of previously described components is omitted.

As shown in FIG. 5, the battery cell 100b according to another exemplary embodiment of the present invention includes the electrode assembly 110, a taping portion 230 enclosing an outer peripheral surface of the electrode assembly 110, the case 120 receiving the electrode assembly 110, and the cap assembly 10 closing an opening of the case 120, and the taping portion 230 includes a first adhesive layer 233, a first base layer 232, a second adhesive layer 238, and a second base layer 231 sequentially stacked, and the second base layer 231 has a plurality of first groove portions 234 and first protrusion portions 235.

As shown in FIGS. 5 and 6, the taping portion 230 includes the second adhesive layer 238 between the first base layer 232 and the second base layer 231 to attach the first base layer 232 to the second base layer 231. However, in another embodiment, the second adhesive layer 238 may be omitted, and the first base layer 232 may be heat-joined to the second base layer 231, for example.

In one embodiment, the second base layer 231 has a plurality of grooves to form the first groove portions 234 that are at a relatively lower position and the first protrusion portions 235 that are at a relatively higher position. That is, the outer surface of the second base layer 231 may have the first groove portions 234 and the first protrusion portions 235 alternating. In one embodiment, as shown in FIG. 5, the first protrusion portions 235 contact an inner peripheral surface of the case 120 and the groove portions 234 may not contact the case 120. As a result, at the time of inserting the electrode assembly 110 into the case 120, friction is reduced, thereby making it possible to easily insert the electrode assembly 110. In a case in which friction is high at a time of inserting an electrode assembly into a case, the friction between an outer surface of the electrode assembly or a taping portion and the case may cause insertion of the electrode assembly to be difficult and a U-shaped phenomenon in which a central portion of the electrode assembly is sagged may occur. However, in the taping portion 230 according to an exemplary embodiment of the present invention, only the first protrusion portions 235 generate friction with the inner peripheral surface of the case 120, thereby reducing friction resistance. Therefore, the U-shaped phenomenon described above may be prevented or substantially prevented. In addition, at the time of inserting the electrode assembly 110 an air flow may be generated in the first groove portions 234, thereby making it possible to easily insert the electrode assembly 110. In one embodiment, the first groove portions 234 may extend in a circumferential direction of an outer surface of the electrode assembly 110, or in a direction perpendicular to a winding axis of the electrode assembly 110. However, in another embodiment, the first groove portions 234 may extend in a lengthwise direction of the electrode assembly 110, or in a direction parallel to a winding axis of the electrode assembly 110.

Figure 7:
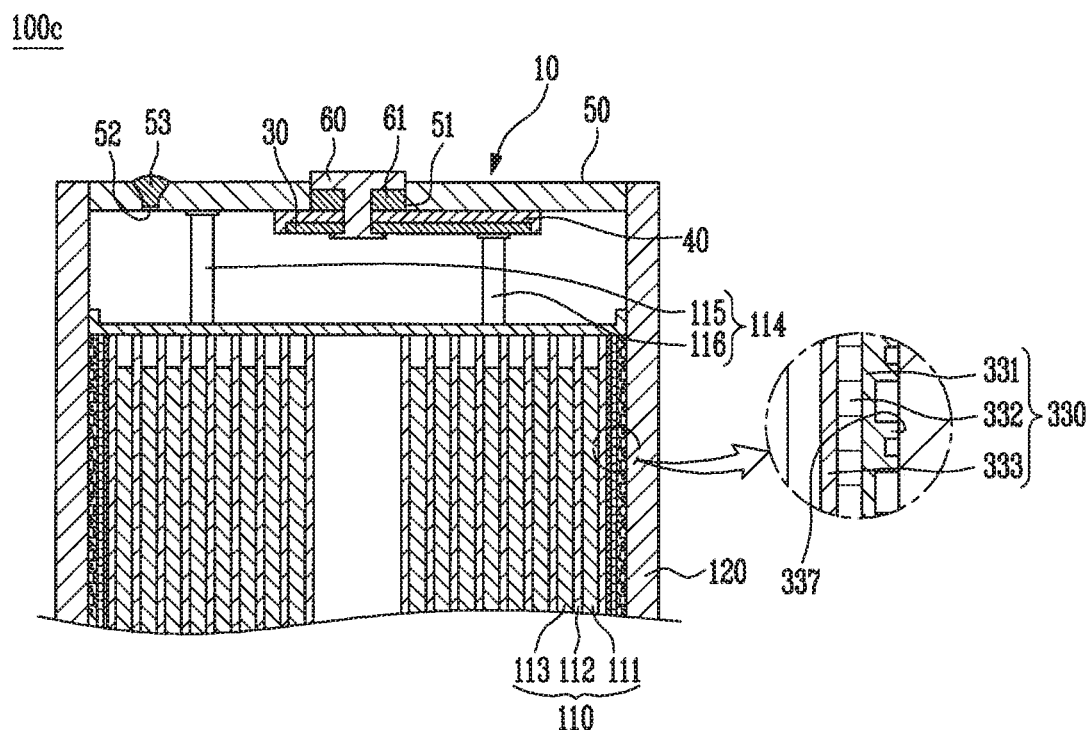
FIG. 7 is a partial cross-sectional view of a battery cell according to another exemplary embodiment of the present invention.
Figure 8:
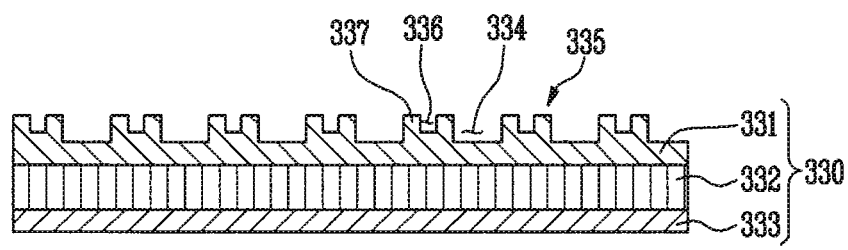
FIG. 8 is a cross-sectional view of a taping portion of the battery cell of FIG. 7, according to an embodiment of the present invention.

FIG. 7 is a partial cross-sectional view of a battery cell 100c according to another exemplary embodiment of the present invention; and FIG. 8 is a cross-sectional view of a taping portion 330 of the battery cell 100c, according to an embodiment of the present invention. The battery cell 100c according to another exemplary embodiment of the present invention is described below with reference to FIGS. 7 and 8. Like reference numerals will be used to describe like or corresponding components and further description of previously described components is omitted.

As shown in FIG. 7, the taping portion 330 of the battery cell 100c according to another embodiment of the present invention includes a first adhesive layer 333, a first base layer 332, and a second base layer 331 sequentially stacked, and the second base layer 331 has a plurality of first groove portions 334 and first protrusion portions 335, and the first protrusion portion 335 is formed with a second groove portion 336 and a second protrusion portion 337.

In one embodiment, the first protrusion portion 335 of the second base layer 331 of the taping portion 330 is further formed with the second groove portion 336 and the second protrusion portion 337. That is, the second base layer 331 has grooves formed twice. Therefore, as shown in FIG. 7, a region of the second base layer 331 which contacts the inner surface of the case 120 may be limited to the second protrusion portion 337, such that an area of the taping portion 330 which contacts the inner surface of the case is reduced, thereby reducing the friction force with the case 120 at the time of inserting the electrode assembly 110 into the case 120. Accordingly, the U-shaped phenomenon in which the central portion of the electrode assembly 110 is sagged may be prevented or substantially prevented. In one embodiment, the first groove portions 334 and the second groove portions 336 may extend in a circumferential direction of an outer surface of the electrode assembly 110, or in a direction perpendicular to a winding axis of the electrode assembly 110. However, in another embodiment, the first groove portions 334 and the second groove portions 336 may extend in a lengthwise direction of the electrode assembly 110, or in a direction parallel to a winding axis of the electrode assembly 110.

As described above, according to exemplary embodiments of the present invention, a battery cell may have small size and light weight, while, at the same time, having improved stability, by enclosing an electrode assembly received in a case by a taping portion.

Further, according to exemplary embodiments of the present invention, the taping portion includes a base portion having a high elongation and a base portion having a high tensile strength, and the impact strength of the taping portion is improved, thereby improving the stability of the battery cell.

Further, according to exemplary embodiments of the present invention, a battery cell has a reduced friction force due to groove portions and protrusion portions in a second base layer, therefore preventing or substantially preventing a U-shaped phenomenon in which a central portion of the electrode assembly is sagged.

Although some exemplary embodiments of the present invention have been described herein for illustrative purposes, a battery cell according to the present invention is not limited thereto, but, rather, those skilled in the art will appreciate that various modifications, additions, and substitutions are possible, without departing from the spirit and scope of the invention, as disclosed in the accompanying claims.

While the present invention has been described in connection with certain exemplary embodiments, it is to be understood that the present invention is not limited to the disclosed embodiments, but, on the contrary, is intended to cover various modifications and equivalent arrangements included within the spirit and scope of the appended claims, and equivalents thereof.

What is claimed is:

1. A battery cell comprising:
an electrode assembly;
a taping portion on the electrode assembly, the taping portion comprising:
a first adhesive layer on the outer surface of the electrode assembly;
a first base layer on the first adhesive layer and made of a first material; and
a second base layer on the first base layer and made of a second material different from the first material; and
a case receiving the electrode assembly,
wherein the second base layer is between the first base layer and the case,
wherein the first material has an elongation greater than an elongation of the second material, and
wherein the second material has a tensile strength greater than a tensile strength of the first material.

2. The battery cell of claim 1, wherein the elongation of the first material is greater than 139.5%, and the tensile strength of the second material is greater than 21,246.4 N/cm2.

3. The battery cell of claim 1, wherein the taping portion encloses the outer surface of the electrode assembly.

4. The battery cell of claim 1,
wherein the electrode assembly comprises a first electrode plate, a separator, and a second electrode plate wound together and defining a winding end, and
wherein the taping portion covers the winding end.

5. The battery cell of claim 1, wherein the first base layer comprises at least one of polyimide, polyparaphenylene sulfide (PPS), or polypropylene, and the second base layer comprises at least one of polyimide, polyparaphenylene sulfide (PPS), or polyethylene terephthalate (PET).

6. The battery cell of claim 5, wherein the first base layer comprises polypropylene, and the second base layer comprises polyethylene terephthalate (PET).

7. The battery cell of claim 1, wherein the taping portion further comprises a second adhesive layer between the first base layer and the second base layer.

8. The battery cell of claim 1, wherein the first base layer and the second base layer are heat joined to each other.

9. The battery cell of claim 1, wherein the second base layer comprises first protrusions on an outer surface of the second base layer facing away from the first base layer, and first grooves between the first protrusions.

10. The battery cell of claim 9, wherein the first grooves extend around a circumferential direction of the outer surface of the electrode assembly.

11. The battery cell of claim 9, wherein the first protrusions contact an inner surface of the case.

12. The battery cell of claim 9, wherein the first protrusions have substantially rectangular cross-sectional areas.

13. The battery cell of claim 9, wherein the first protrusions comprise second protrusions on outer surfaces of the first protrusions facing away from the first base layer, and second grooves between the second protrusions.

14. The battery cell of claim 13, wherein the second grooves extend around a circumferential direction of the outer surface of the electrode assembly.

15. The battery cell of claim 13, wherein the second protrusions contact an inner surface of the case.

16. The battery cell of claim 1, wherein the second base layer contacts an inner surface of the case.

17. The battery cell of claim 1, wherein the case has a substantially rectangular cross-sectional shape.

* * * * *